United States Patent
Senders

(10) Patent No.: US 12,357,123 B2
(45) Date of Patent: Jul. 15, 2025

(54) AIR-BASED FRYER

(71) Applicant: KONINKLIJKE PHILIPS N.V., Eindhoven (NL)

(72) Inventor: Martin Godefriedus Hendrikus Senders, Meeuwen (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 699 days.

(21) Appl. No.: 15/733,929

(22) PCT Filed: Jun. 10, 2019

(86) PCT No.: PCT/EP2019/065055
§ 371 (c)(1),
(2) Date: Dec. 1, 2020

(87) PCT Pub. No.: WO2019/243093
PCT Pub. Date: Dec. 26, 2019

(65) Prior Publication Data
US 2021/0219778 A1 Jul. 22, 2021

(30) Foreign Application Priority Data
Jun. 18, 2018 (EP) ..................... 18178172

(51) Int. Cl.
*A47J 37/06* (2006.01)
(52) U.S. Cl.
CPC ....... *A47J 37/0641* (2013.01); *A47J 37/0664* (2013.01)
(58) Field of Classification Search
CPC .................... A47J 37/0641; A47J 37/0664
USPC ....................................... 126/21 A
See application file for complete search history.

(56) References Cited

U.S. PATENT DOCUMENTS

| | | | |
|---|---|---|---|
| 4,735,135 A * | 4/1988 | Walker | A47J 43/18 99/421 V |
| 4,942,807 A * | 7/1990 | Wong | A47J 43/044 414/781 |
| 5,027,697 A * | 7/1991 | De Longhi | A47J 37/047 99/410 |
| 5,558,798 A * | 9/1996 | Tsai | A47J 27/04 219/730 |
| 5,868,273 A | 2/1999 | Daenen | |

(Continued)

FOREIGN PATENT DOCUMENTS

| | | |
|---|---|---|
| CN | 203244259 | 10/2013 |
| CN | 103767562 A | 5/2014 |

(Continued)

OTHER PUBLICATIONS

New Professional Seti Silicone Suction Lids and Covers: Set of 6 Including Exclusive 12" Lid. Reusable. Oven, microwave, and dishwasher safe. https://www.amazon.com/Professional-Silicone-Suction-Lids-Covers/dp/B01IRUIT4I/ref=pd_sim_79_4?_encoding=UTF8&pd_rd_i=B01IRUIT4I&pd_rd_r=MZHGXR5PDFD2QXQPCJG7&pd_rd_w=QIWeB&pd_rd_wg=8sizm&pso=1&refRID=MEHGXR5PDFD2QXQPCJG7.

(Continued)

*Primary Examiner* — Avinash A Savani
(74) *Attorney, Agent, or Firm* — Maschoff Brennan

(57) ABSTRACT

An air-based fryer has a removable food receiving chamber which comprises a closed volume. This means that food items with a liquid content can be contained and cooked, and also they do not dry out in that moisture is retained within the volume. A reconfigurable food receiving chamber is also disclosed which may function as a basket or a pot.

12 Claims, 3 Drawing Sheets

(56) References Cited

U.S. PATENT DOCUMENTS

| | | | |
|---|---|---|---|
| 2005/0223906 A1* | 10/2005 | Xu | A47J 27/004 |
| | | | 99/348 |
| 2006/0151492 A1* | 7/2006 | Bray | A47J 36/027 |
| | | | 219/756 |
| 2008/0099008 A1 | 5/2008 | Bolton | |
| 2012/0107476 A1* | 5/2012 | McLemore | A23L 5/15 |
| | | | 426/523 |
| 2013/0125765 A1* | 5/2013 | Difante | A47J 36/20 |
| | | | 99/403 |
| 2013/0180413 A1 | 7/2013 | Tjerkgaast | |
| 2013/0200081 A1 | 8/2013 | Wilkinson | |
| 2017/0231430 A1* | 8/2017 | Moon | A47J 37/1266 |
| | | | 99/331 |
| 2017/0245686 A1* | 8/2017 | Man | A47J 37/1257 |
| 2017/0251874 A1* | 9/2017 | Sladecek | A47J 37/0641 |
| 2018/0078089 A1* | 3/2018 | Sauer | A47J 37/0641 |
| 2018/0255971 A1* | 9/2018 | Moon | A47J 37/0641 |

FOREIGN PATENT DOCUMENTS

| | | | |
|---|---|---|---|
| CN | 104138222 | 11/2014 | |
| CN | 105263379 A | 1/2016 | |
| CN | 105595858 A | 5/2016 | |
| CN | 105705068 A | 6/2016 | |
| CN | 205568763 | 9/2016 | |
| WO | 2007/144432 | 12/2007 | |
| WO | 2015176973 A1 | 11/2015 | |
| WO | 2016113164 A1 | 7/2016 | |
| WO | WO-2016156205 A1 * | 10/2016 | A47J 36/38 |

OTHER PUBLICATIONS

International Search Report and Written Opinion Dated Oct. 31, 2019 For International Application No. PCT/EP2019/065055 Filed Jun. 10, 2019.

New Professional Set! Silicone Suction Lids and Covers: Set of 6 Including Exclusive 12" Ltd. Reusable. Oven, microwave, and dishwasher safe. https://www.amazon.com/Professional-Silicone-Suction-Lids-Covers/dp/B01IRUIT4l/ref=pd_sim_79_4?encoding=UTF8&pd_rd_i=B01IRUIT4I&pd_rd_r=MZHGXR5PDFD2QXQPCJG7&pd_rd_w=QIWeB&pd_rd_wg=8sizmm&pso=1&refRID=MZHGXR5PDFD2QXQPCJG7.

Whatmproducts: Pushpan Brochure.

* cited by examiner

AIR-BASED FRYER

CROSS REFERENCE TO RELATED APPLICATIONS

This application is the U.S. National Phase application under 35 U.S.C. § 371 of International Application No. PCT/EP2019/065055 filed Jun. 10, 2019, which claims the benefit of European Patent Application Number 18178172.5 filed Jun. 18, 2018. These applications are hereby incorporated by reference herein.

FIELD OF THE INVENTION

The present invention relates to an air-based fryer.

BACKGROUND OF THE INVENTION

Air-based fryers are known, for instance from WO2007/144432.

Typically, they comprise a cooking chamber and an air-permeable basket for supporting food ingredients to be cooked. The basket defines a food receiving chamber. A flow of hot air is circulated around and through the food ingredients in the food receiving chamber with relatively high speed, providing the heat needed to cook the food. Thus, the food can be cooked in a healthy manner, with no or much less fat compared to conventional deep-fat frying.

Air-based fryers can be used for preparing a large variety of food ingredients. However, the general operation involves placing the food items in a basket with a grid base, so that air can flow through the food from beneath.

This means the air-based fryer is only suitable for cooking solid food items.

The grid base may be removable from the remainder of the basket for cleaning. However, the grid base generally leaves deposits on the remainder of the basket which may be difficult to remove or which may be missed by the user, because they clean the grid base much more thoroughly.

It is known to provide a cooking pot accessory which can be inserted into the cooking chamber so that food items with a liquid content can be cooked. However, the air-based fryer tends to dry out such food items because there is a continuous flow of air which removes all moisture from the cooking chamber. Thus, there is a limit to the range of food types which can be cooked in an effective manner using an air-based fryer.

SUMMARY OF THE INVENTION

The invention is defined by the claims.

According to examples in accordance with an aspect of the invention, there is provided an air-based fryer, comprising:
  a cooking chamber;
  a food receiving chamber adapted to be removably received in the cooking chamber such that an air passage is formed all around the food receiving chamber;
  a heater for heating air in the cooking chamber; and
  a fan for circulating a flow of hot air in the cooking chamber through the air passage around the food receiving chamber,
  wherein the food receiving chamber comprises a closed volume.

By "closed volume" is meant that the inside of the food receiving chamber is substantially air tight and water tight. However, some gas leakage is either inevitable or indeed desired as discussed below. Thus, a closed volume does not imply a perfect hermetic seal. This design of food receiving chamber increases the range of cooking possibilities with the air-based fryer. In particular, food with a large liquid content may be cooked, such as soups, stews, rice, risottos and curries. The cooking avoids burning, by having the food receiving chamber surrounded by a hot air flow for example only of around 200 degrees, so a slow cooking process is performed.

The food receiving chamber preferably comprises a base, a receiving chamber lid, and a side wall.

The air-based fryer may further comprise a main body which has an opening for accessing the cooking chamber, either laterally or from above, wherein the main body forms a cooking chamber lid.

A laterally accessible cooking chamber for example may slide into and out of the main body in the form of a drawer. The receiving chamber lid is for example biased open, and closes when the cooking chamber is inserted into the opening.

A cooking chamber accessible from above may for example be formed by a main body having a top lid which is hinged open. It may couple to the food receiving chamber so that the top lid and the food receiving chamber lid hinge open and closed together.

In both cases, the receiving chamber lid is adapted to be closed when the cooking chamber is closed. This provides an automatic lid closing function for the food receiving chamber.

The base is preferably removable for cleaning.

The base may comprise a silicone seal, which is a press fit into the bottom of the side wall. This provides an arrangement in which the side wall is easier to clean, in that it may have only a smooth lip type surface for engaging with the base.

The base may comprise a support structure which is encased in silicone or a support structure having an outer rim which is encased in silicone.

Alternatively, the side wall comprises a receiving opening which comprises a silicon seal for receiving an outer edge of the base.

In either case, a smooth interface is provided between the removable base and the side wall, for ease of cleaning.

The air-based fryer may further comprise a second base which comprises a mesh.

This second base allows the same side wall of the receiving chamber to be used for a conventional air-based fryer basket. By removing the solid (airtight and watertight) base, and inserting the mesh base, the closed chamber is transformed to a basket.

The receiving chamber lid may also be removable. In this way the closed food receiving chamber may be converted to an open pot, and if the second base with a mesh is also used, the closed food chamber is converted to an open top basket.

Thus, a versatile set of options is created with shared components.

The invention also provides an accessory kit for an air-based fryer, comprising:
  a food receiving chamber comprising a side wall and a base opening; and
  first and second base walls, wherein each base wall is adapted for interchangeable connection to the base opening,
  wherein the first base wall comprises a solid plate and the second base wall comprises a mesh.

This accessory kit has a side wall which may be attached to different bases to define different designs of food receiving chamber. One design has a solid base, which may then form a pot for example for food ingredients with a significant water content such as soups, stews and curries. The other design has an open base, which may be used to form a basket, for example for cooking chips or other vegetables.

The accessory kit may further comprise a lid, such that the side wall, the first base wall and the lid form a closed volume. This enables a closed pot to be formed, which enables food ingredients with a significant water to be cooked while preserving more of the water content.

The lid is for example removable from the remainder of the food receiving chamber, so that the accessory kit gives a versatile set of options.

The accessory kit for example further comprises a mounting unit for mounting the food receiving chamber in a cooking chamber of an air-based fryer such that an air passage is formed all around the food receiving chamber. No matter which configuration of the accessory kit is used, it is positioned within the cooking chamber of an air-based fryer to have a circulating air flow around (and optionally through, depending on the configuration) the food receiving chamber.

The invention also provides use of a food receiving chamber in the cooking chamber of an air-based fryer, wherein the food receiving chamber has an air passage is formed all around the food receiving chamber and wherein the food receiving chamber comprises a closed volume.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
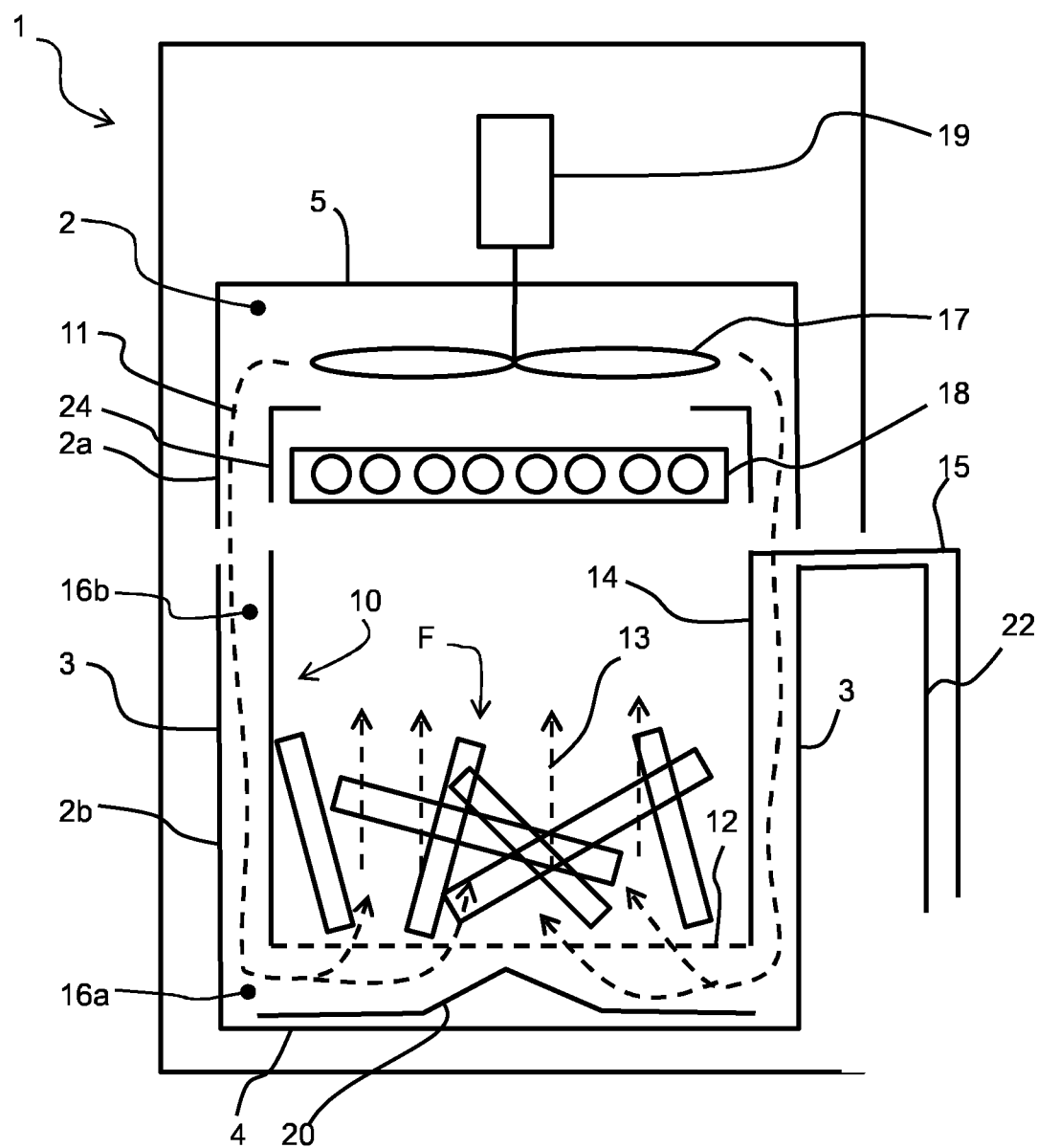
FIG. 1 shows a known design of air-based fryer in cross-sectional view.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an air-based fryer in which the removable food receiving chamber comprises a closed volume. This means that food items with a liquid content can be contained and cooked, and also they do not dry out in that moisture is retained within the volume. A reconfigurable food receiving chamber is also provided which may function as a basket or a pot.

FIG. 1 shows a known design of air-based fryer 1 in cross-sectional view. The air-based fryer 1 comprises a cooking chamber 2 with sidewalls 3, a bottom wall 4 and a top wall 5. A basket 10 is disposed within the cooking chamber 2 to support food F to be cooked.

The basket 10 comprises an air-permeable bottom 12 and solid side walls 14. It has an open top, although a permeable cover plate may also be provided. The bottom 12 for example comprises a wire mesh which may be a snap fit into the base of the basket within the side walls 14. The wire mesh is for example removable for cleaning, e.g. in a dishwasher, whereas the remainder of the basket is typically wiped clean by the user.

A mounting structure 15 is provided to detachably mount the basket 10 in the cooking chamber 2. The mounting structure 15 is designed to allow air to circulate all around the basket 10 in the mounted condition. The mounting structure 15 is designed such that in mounted condition a bottom gap 16a is provided between the air-permeable bottom 12 and the bottom wall 4 of the cooking chamber 2. Furthermore, a lateral gap 16b is provided between the sidewalls 3 of the cooking chamber 2 and the perimeter of the air-permeable bottom 12. The bottom gap 16a and lateral gap 16b together form part of an air circulation channel.

The mounting structure 15 is designed to minimize obstruction of said air circulation channel.

In some embodiments, as illustrated in FIG. 1, the mounting structure 15 comprises a handle, with which the basket 10 may be suspended from a sidewall 3 of the cooking chamber 2. The handle allows a user to easily remove the basket 10 from the cooking chamber 2.

The air-based fryer 1 further comprises an air circulation system comprising a fan 17, a motor 19 and an air heater 18 for circulating hot air in the cooking chamber 2. The air heater 18 may be disposed above the basket 10. In such a case, the air heater 18 may radiate heat directly to the food ingredients F in addition to heating the air in the cooking chamber 2.

The air circulation system may also be disposed above the basket 10 for example above the air heater 18.

The air circulation system is designed to pass hot air through the air-permeable bottom 12 of the basket 10 such that food F disposed thereon will be prepared by a through-streaming of hot air.

The air circulation system in this example is designed to draw air upward through the basket 10 as shown by arrows 13. The air may subsequently be passed along the air heater 18 to heat the air. The air heater 18 may be any appropriate heating source, such as an electric heater which can heat air to, for example, between roughly 100° C. and 250° C. by controlling the power supplied to the air heater.

As shown by arrows 11, the air circulation system is designed to pass hot air downward along an inner surface of the cooking chamber 2 and an outer surface of the basket 10. The bottom gap 16a and lateral gap 16b together form an air circulation channel for guiding the flow of hot air from the air circulation system to the bottom 12 of the basket 10.

The bottom wall 4 of the cooking chamber 2 may be flat or as shown in FIG. 1 the bottom wall 4 may be provided with an air guide member 20 configured to direct the hot air flow towards and/or through the air-permeable bottom 12 of the basket 10.

The air guide member 20 may have a substantially conical, or frusto-conical outer contour or it may comprise ribs or arms. The air guide member 20 may be integrally formed in the bottom wall 4 of the cooking chamber or be provided as a separate insert.

In the example shown, a deflector plate 24 is provided in an upper part of the cooking chamber 2 above the basket 10, to further enclose a volume enclosed by the basket 10, and to help guiding air from the air circulation system 6 around the basket into the air circulation channel formed by the bottom gap 16*a* and lateral gap 16*b*.

The cooking chamber 2 is shown with an upper section 2*a* and a lower section 2*b*, separable from each other to enable access into the cooking chamber 2. The upper section 2*a* thus functions as a cooking chamber lid. In some embodiments, the lower section 2*b* may be arranged stationary and the upper section 2*a* may be releasably or hingedly arranged, e.g. in the form of a lid. In some embodiments, the upper section 2*a* may be arranged stationary and the lower section 2*b* may be releasably arranged, e.g. in the form of a drawer. In such case, the lower section 2*b* may comprise a handle 22 to aid removal of the lower section 2*b* from the air-based fryer 1, as illustrated in FIG. 1.

The air-based fryer 1 may comprise a vent (not shown), defining an air outlet from the cooking chamber 2 to outside the air-based fryer 1.

In use, a variety of food types may be prepared in the air-based fryer 1. In case where the food is a bulk type of food, the individual food ingredients F may form a pile as illustrated in FIG. 1, with the height, density and consequently the flow resistance being highest in the center of the pile and decreasing towards the periphery.

The bottom 12 of the basket 10 may for example be designed to have a flow resistance that reversely mirrors the flow resistance of the pile, so is lowest in the center and increases towards the periphery. Thus, the total flow resistance of the bottom 12 and pile together may be more or less constant over the entire cross section of the basket 10, resulting in a more homogeneous air flow through the basket 10 and, ultimately, in more homogeneous cooking results.

There exist cooking accessories for air-based fryers in the form of a pot with a closed base and an open top, so that ingredients with a liquid content may be cooked. However, the rapid air flow tends to dry out the ingredients so the air-based fryer does not provide optimal cooking conditions.

The invention in one aspect provides a closed cooking vessel for use within an air-based fryer.

Figure 2:
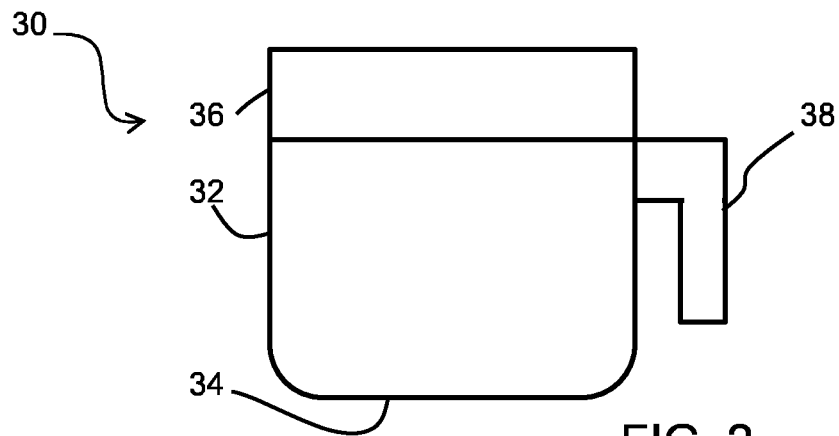
FIG. 2 shows a food receiving chamber which is used in the place of the basket within an air-based fryer.

FIG. 2 shows a food receiving chamber 30 which is used in the place of the basket 10 within an air-based fryer, for example of the type shown in FIG. 1.

The food receiving chamber comprises a side wall (or side walls) 32, a base 34 and a lid 36. The base and lid are both air tight and water tight so that a closed volume is formed, i.e. closed to the passage of air, water and water vapor, in particular.

A handle 38 functions as a mounting unit for mounting the food receiving chamber 30 in the cooking chamber of the air-based fryer such that the desired air passage 16*a*, 16*b* (FIG. 1) is formed all around the food receiving chamber.

The handle 38 performs the same function as the mounting structure 15 of the conventional basket. It is used to detachably mount the food receiving chamber 30 in the cooking chamber 2, in particular in the lower section 2*b* of the cooking chamber 2. The handle 38 positions the food receiving chamber such that air can circulate all around the food receiving chamber by means of the bottom gap 16*a* and the lateral gap 16*b* discussed above with reference to FIG. 1.

Instead of a handle, the food receiving chamber could be provided with a mounting unit in the form of a supporting rim or supporting legs, or other spacers to allow the chamber 30 to be surrounded from all sides by said bottom gap 16*a* and lateral 16*b*.

Thus, there may be a shared handle which couples the lower section of the cooking chamber and the food receiving chamber together, or there may be a handle for the lower section of the cooking chamber, whereas the food receiving chamber is placed inside the cooking chamber with a different type of mounting unit. For a design in which the cooking chamber is inserted from above through an open lid, there may be no handle (the cooking chamber may simply be lifted in and out with oven gloves), but even then a handle is preferably provided so the user does not need to touch any hot parts.

The closed volume does not need to be perfectly sealed. However, it should be sufficiently closed that liquid cannot escape from the base at least, so that food with a higher liquid content may be cooked, and so that there is no significant airflow across any outer wall of the food receiving chamber.

The air flow generated by the air-based fryer is around the outside of the food receiving chamber 30 but not through the contents. It also means that a humid environment is maintained in the food receiving chamber.

Note that the food receiving chamber may have a vent opening for the purposes of pressure release, for example with a pressure release valve. Thus, it may be closed when at ambient pressure. If a permanently open vent opening is provided, the food receiving chamber may still be considered to be closed, in that the allowed release of gas and moisture is kept to a minimal level, with the allowed escape for safety reasons only. The term "closed" should be understood accordingly.

In addition to expanding the types of cooking that may be performed, this arrangement is particularly suitable for re-heating since it avoids moisture loss.

Figure 3:
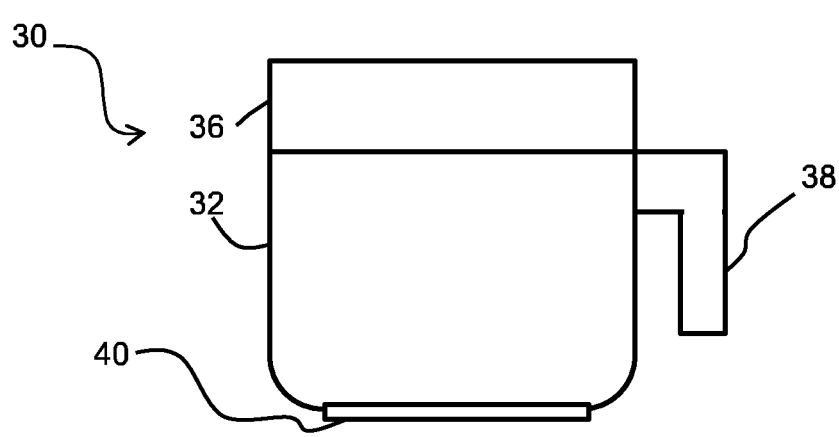
FIG. 3 shows a food receiving chamber with a base which is removable from the remainder of the food receiving chamber.

The base is preferably removable for cleaning. FIG. 3 shows a base 40 which is removable from the remainder of the food receiving chamber 30.

The base 40 for example may comprise a silicone seal, which is a press fit into the opening defined by the bottom of the side wall. This provides an arrangement in which the side wall is easier to clean, in that it may have only a smooth lip type surface for engaging with the base. The base may then be a metal or ceramic part.

The base and/or side wall and/or lid may be made at least partially transparent, to allow inspection of the food inside without opening the food receiving chamber.

The base 40 may comprise a support structure which is encased in silicone or a support structure having an outer rim which is encased in silicone. Alternatively, the side wall defines a receiving opening which comprises a silicon seal for receiving an outer edge of the base.

The food receiving chamber may further comprise a second base which comprises a mesh. This second base allows the same side wall 32 of the receiving chamber 30 to be used for a conventional air-based fryer basket. By removing the solid base, and inserting the mesh base, the closed chamber is transformed to a basket.

Figure 4:
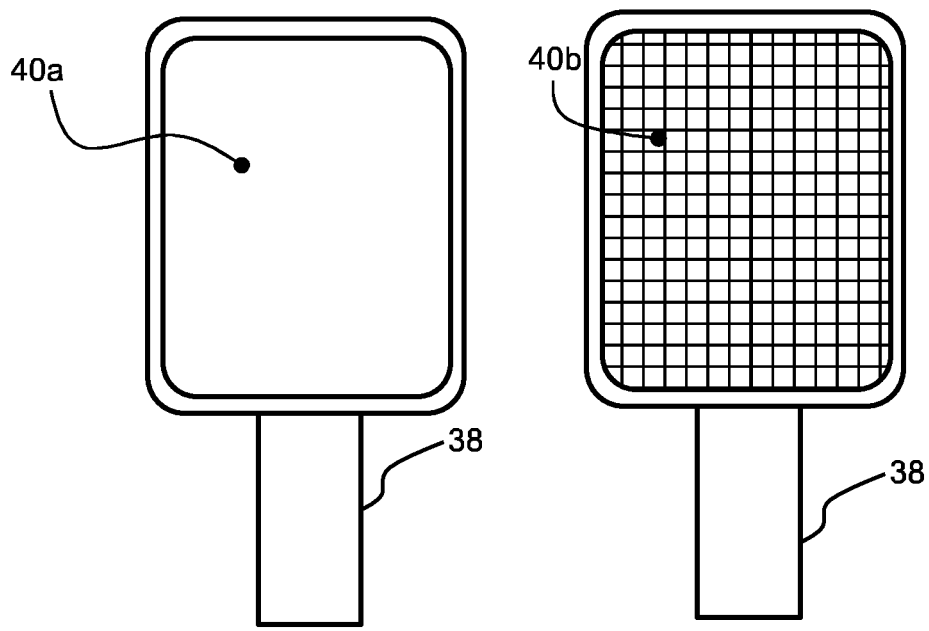
FIG. 4 shows the food receiving chamber from above, with a solid base.
Figure 5:
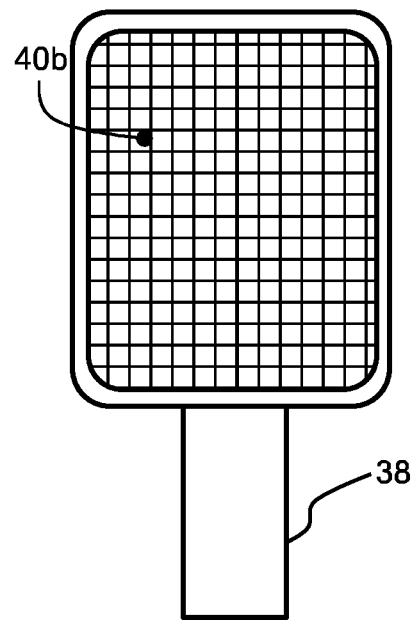
FIG. 5 shows the food receiving chamber from above, with a mesh base.

FIG. 4 shows the food receiving chamber from above, with a solid base 40a, and FIG. 5 shows the food receiving chamber from above, with a mesh base 40b.

The receiving chamber lid 36 may also be removable. In this way, the closed food receiving chamber may be converted to an open pot when used with a solid base, and if the mesh base is used as well, the closed food chamber is converted to a basket with an open top.

Thus, a versatile set of options is created with shared components.

Figure 6A:
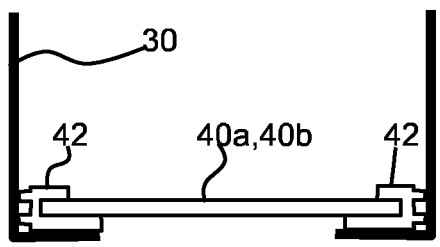
FIGS. 6A and 6B show two possible seal designs.
Figure 6B:
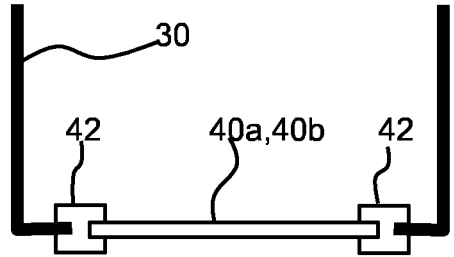

FIGS. 6A and 6B show two possible designs for the seal. The seal 42 comprise a silicone seal which surrounds an outer rim of the solid base 40a or mesh base 40b, and it provides a sealed fit to the bottom of the food receiving chamber 30.

The base may be removed while attached to the seal so that they together form a module, or else the seal may be fixed in position to the bottom of the food receiving chamber 30 so that the base 40a or 40b is removed from the seal in order to remove it from the food receiving chamber 30.

Any possible design for the seal is possible. FIG. 6A is an example in which the seal provides an annular radial outer seal against an inner face of the side wall as a well as a lower seal against a bottom lip of the basket. FIG. 6B is an example in which the base is mounted within an opening defined by a bottom lip of the food receiving chamber 30 and in which the seal has a radial inner part for the base and a radial outer part for the bottom lip of the food receiving chamber.

The cooking chamber has a lid 2a as explained above for closing the cooking chamber when the food receiving chamber has been be inserted into the opening of the main body.

The receiving chamber lid 36 may be adapted to be closed when the cooking chamber is closed, so that the cooking chamber and food receiving chamber open and close together.

Figure 7A:
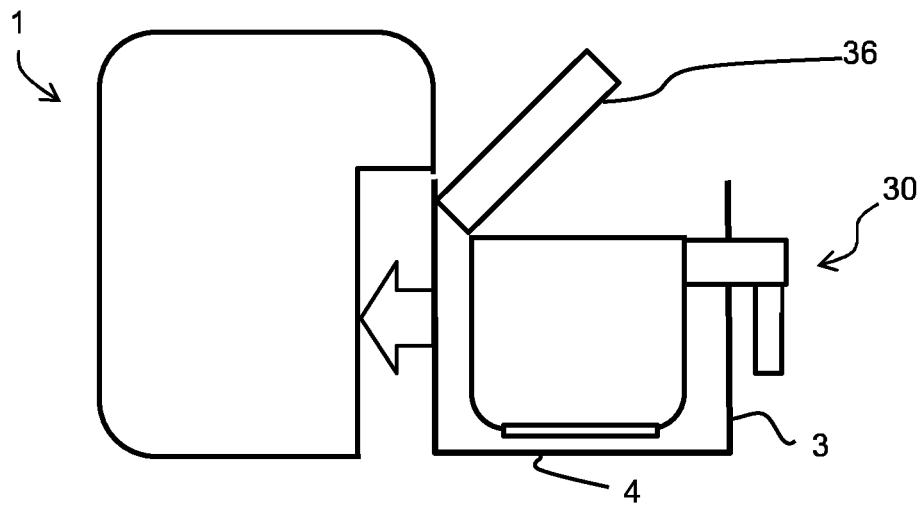
FIGS. 7A and 7B show an arrangement in which the food receiving chamber is slid into a main body of the air-based fryer with an automatic closing of the food receiving chamber.
Figure 7B:
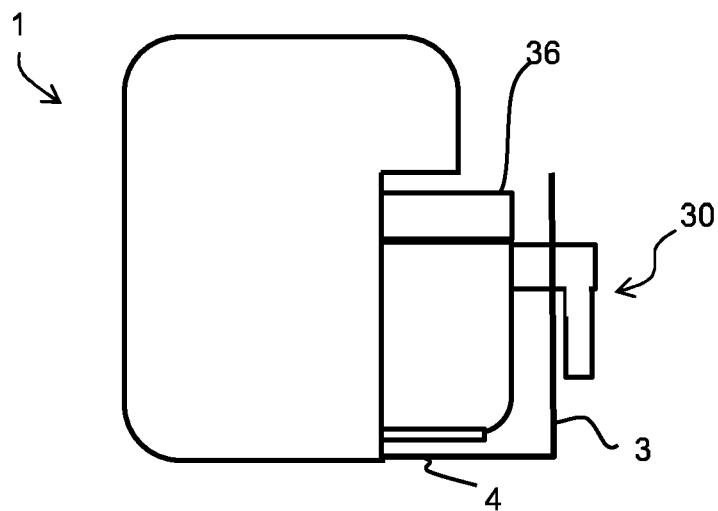

In one arrangement shown in FIGS. 7A and 7B, the food receiving chamber 30, within the base part of the cooking chamber (side walls 3 and base wall 4), is slid into an opening of a main body of the air-based fryer 1 in the manner of a drawer. The receiving chamber lid 36 is for example spring-biased open as shown in FIG. 7A, and closes when the food receiving chamber 30 is and the base part of the cooking chamber are inserted as shown in FIG. 7B.

In another arrangement, the main body of the air-based fryer may have a top lid which is hinged open. It may couple to the food receiving chamber so that both lids hinge open and closed together.

The invention may be applied to different types of air-based fryer, of which FIG. 1 is only one example. The resulting cooking function is of a closed food chamber around which hot air is circulated at a relatively low temperature, e.g. below 250 degrees or even below 200 degrees. The closed chamber maintains humidity, which may assist reheating as well as some cooking processes.

As explained above, one aspect of the invention is the use of a closed food receiving chamber in the cooking chamber of an air-based fryer, with an air passage formed all around the food receiving chamber.

Another aspect is the food receiving chamber with a reconfigurable base, as shown in FIGS. 4 and 5, regardless of whether there is a closed top or not. Thus, in this aspect, the invention relates to an accessory kit of one side wall with a base opening and at least first and second base walls, which may be separately fitted to the side wall. One base wall comprises a solid plate to form an open or closed pot, and another base wall comprises a mesh to form a cooking basket. The lid, to enable a closed volume to be formed, is then a further optional feature.

A mounting unit (for example a handle) is used for mounting the food receiving chamber in the cooking chamber of the air-based fryer to provide the desired air passage all around the food receiving chamber.

As explained above, air-based fryers are a well known type of kitchen appliance, distinct from ovens, fan ovens, freestanding cookers, worktop mounted mini ovens, bread makers and the like.

Air-based fryers comprise a freestanding portable worktop mountable device. They are electric devices for plugging into a domestic mains supply, for example with a rating of less than 3 kW, for example less than 2 kW.

The air-based fryer comprises an outer housing and a basket that is mounted inside the outer housing. The basket may be mounted from above through a lid or it may be slid in sideways as a drawer. In either case, the basket defines a large proportion of the internal cooking chamber volume of the appliance, such as at least 50% of the internal volume, for example at least 70% of the internal volume.

For a drawer design, a handle serves to pull the draw laterally out from the main body of the appliance and also to lift a basket out from the drawer base.

An air fryer typically has a smaller capacity than a convection oven, for example less than 4 liters capacity, for example less than 3 liters capacity.

Many air-based fryers include an air guide at the base of the cooking chamber (as described above) and the fan is positioned above the cooking chamber to draw air vertically up through the cooking chamber.

Air-based fryers are also generally known as air fryers.

One aspect of the invention is an air-based fryer with a closed volume food receiving chamber to be removably received in the cooking chamber.

Another aspect is an air-based fryer, comprising:
a cooking chamber (2);
a main body which has an opening for providing access to the cooking chamber, either laterally or from above, wherein the main body forms a cooking chamber lid (2a) for closing said opening;
a food receiving chamber (30) adapted to be removably received in the cooking chamber (2) such that an air passage (16a, 16b) is formed all around the food receiving chamber (30), wherein the food receiving chamber (30) comprises a base (34), a receiving chamber lid (36), and a side wall (32);
a heater (18) for heating air in the cooking chamber; and
a fan (17) for circulating a flow of hot air in the cooking chamber through the air passage around the food receiving chamber,
wherein the food receiving chamber (30) comprises a closed volume, and
wherein the receiving chamber lid is adapted to be closed when the cooking chamber lid is closed.

Another aspect is an air-based fryer, comprising:
a cooking chamber (2);
a food receiving chamber (30) adapted to be removably received in the cooking chamber (2) such that an air passage (16a, 16b) is formed all around the food receiving chamber (30), wherein the food receiving chamber (30) comprises a first base (34) which is a solid plate, a second base (40b) which comprises a mesh, a receiving chamber lid (36), and a side wall (32), wherein the first and second bases are interchangeably mountable to the side wall (32);
a heater (18) for heating air in the cooking chamber; and
a fan (17) for circulating a flow of hot air in the cooking chamber through the air passage around the food receiving chamber,
wherein the food receiving chamber (30) comprises a closed volume when the first base and lid are applied.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An air-based fryer, comprising:
a cooking chamber;
a food receiving chamber adapted to be removably received in the cooking chamber such that an air passage is formed all around the food receiving chamber;
a heater for heating air in the cooking chamber; and
a fan for circulating a flow of hot air in the cooking chamber through the air passage formed outside the food receiving chamber,
wherein the food receiving chamber comprises a base, a receiving chamber lid, and a side wall adapted to close the air passage to form a closed volume.

2. The air-based fryer as claimed in claim 1, further comprising a main body which has an opening for providing access to the cooking chamber, either laterally or from above, wherein the main body forms a cooking chamber lid for closing said opening.

3. The air-based fryer as claimed in claim 2, wherein the receiving chamber lid is adapted to be closed when the cooking chamber lid is closed.

4. The air-based fryer as claimed in claim 1, wherein the base is removable for cleaning.

5. The air-based fryer as claimed in claim 4, wherein the base comprises a silicone seal, which is a press fit into the bottom of the side wall.

6. The air-based fryer as claimed in claim 5, wherein the base comprises a support structure which is encased in silicone or a support structure having an outer rim which is encased in silicone.

7. The air-based fryer as claimed in claim 5, wherein the side wall comprises a receiving opening which comprise a silicon seal for receiving an outer edge of the base.

8. The air-based fryer as claimed in claim 1, further comprising another base which comprises a mesh.

9. An accessory kit for an air-based fryer, comprising:
a food receiving chamber comprising a side wall and a base opening;
a lid;
first and second base walls, wherein one of the first and the second base walls is adapted for interchangeable connection to the base opening to define a bottom wall of the food receiving chamber,
wherein the first base wall comprises a solid plate and the second base wall comprises a mesh, and
wherein the side wall, the first base wall adapted to close the air passage, and the lid form a closed volume; and
a mounting unit for mounting the food receiving chamber in a cooking chamber of the air-based fryer such that the air passage for circulation of hot air is formed outside the food receiving chamber to prepare food.

10. The accessory kit as claimed in claim 9, wherein the lid is removable from remainder of the food receiving chamber.

11. An accessory kit for an air-based fryer, comprising:
a food receiving chamber comprising a side wall and a base opening;
first and second base walls, wherein each base wall is adapted for interchangeable connection to the base opening to define a bottom wall of the food receiving chamber,
wherein the first base wall comprises a solid plate adapted to close an air passage to form a closed volume and the second base wall comprises a mesh that provides the air passage; and
a mounting unit for mounting the food receiving chamber in a cooking chamber of the air-based fryer such that the air passage for circulation of hot air is formed outside the food receiving chamber to prepare food.

12. An air-based fryer system, comprising:
an air-based fryer comprising:
a cooking chamber;
a heater for heating air in the cooking chamber; and
a fan for circulating a flow of hot air in the cooking chamber; and
an accessory kit comprising,
a food receiving chamber comprising a side wall and a base opening;
a lid; and
first and second base walls, wherein one of the first and the second base walls is adapted for interchangeable connection to the base opening to define a bottom wall of the food receiving chamber,
wherein the first base wall comprises a solid plate and the second base wall comprises a mesh,
wherein the side wall, the first base wall adapted to close an air passage, and the lid form a closed volume,
wherein the lid is removable from the remainder of the food receiving chamber, and
wherein the food receiving chamber of the accessory kit is adapted to be removably received in the cooking chamber such that the air passage is formed outside the food receiving chamber.

* * * * *